(12) United States Patent
Guimet et al.

(10) Patent No.: US 10,428,959 B2
(45) Date of Patent: Oct. 1, 2019

(54) ASSEMBLY FOR COMPRESSING A BALL VALVE SEAT

(71) Applicants: COMMISSARIAT A L'ENERGIE ATOMIQUE ET AUX ENERGIES ALTERNATIVES, Paris (FR); TECHNETICS GROUP FRANCE SAS, Saint Etienne (FR)

(72) Inventors: Laurent Guimet, Unieux (FR); Florent Ledrappier, Saint Paul Trois Chateaux (FR); Michel Lefrancois, Saint Etienne (FR)

(73) Assignees: COMMISSARIAT A L'ENERGIE ATOMTQUE ET AUX ENERGIES ALTERNATIVES, Paris (FR); TECHNETICS GROUP FRANCE SAS, Saint Etienne (FR)

( * ) Notice: Subject to any disclaimer, the term of this patent is extended or adjusted under 35 U.S.C. 154(b) by 0 days.

(21) Appl. No.: 15/518,014

(22) PCT Filed: Oct. 13, 2015

(86) PCT No.: PCT/EP2015/073614
§ 371 (c)(1),
(2) Date: Apr. 10, 2017

(87) PCT Pub. No.: WO2016/059015
PCT Pub. Date: Apr. 21, 2016

(65) Prior Publication Data
US 2017/0299071 A1    Oct. 19, 2017

(30) Foreign Application Priority Data
Oct. 15, 2014  (FR) ...................... 14 59891

(51) Int. Cl.
*F16K 5/06*   (2006.01)
*F16K 5/20*   (2006.01)
*F16K 27/06*  (2006.01)

(52) U.S. Cl.
CPC ............ *F16K 5/0678* (2013.01); *F16K 5/201* (2013.01); *F16K 27/067* (2013.01)

(58) Field of Classification Search
CPC ...... F16K 5/0678; F16K 27/067; F16K 5/201; F16K 5/0673; F16K 5/0689; F16K 5/0694; F16K 5/0663; F16K 5/0668
(Continued)

(56) References Cited

U.S. PATENT DOCUMENTS 3,114,386 A * 12/1963 Dumm .................. F16K 5/0678
                                                              137/316
3,575,198 A    4/1971  Ellis
(Continued)

OTHER PUBLICATIONS

International Search Report dated Jan. 26, 2016 in PCT/EP2015/073614 filed Oct. 13, 2015.
(Continued)

*Primary Examiner* — Michael R Reid
(74) *Attorney, Agent, or Firm* — Oblon, McClelland, Maier & Neustadt, L.L.P.

(57) ABSTRACT

An annular assembly for compressing a seat of a ball-valve, including: a valve body or insert, including an annular internal counter-bore that defines an inner counter-bore diameter; a sleeve inserted into the annular internal counter-bore, defining at least one outer diameter of the sleeve; the body or the insert defining with the sleeve an annular housing in which the assembly includes, in succession: a downstream stack of head rings, an annular head shim, a stack of mechanisms of compression, an annular base shim, and an upstream stack of base rings.

7 Claims, 3 Drawing Sheets

(58) Field of Classification Search
USPC ........ 251/180, 192, 171, 160, 181, 314–316
See application file for complete search history.

(56) References Cited

U.S. PATENT DOCUMENTS

| | | | |
|---|---|---|---|
| 3,891,183 A | | 6/1975 | Feiring |
| 4,505,294 A | | 3/1985 | Walter |
| 4,572,239 A | * | 2/1986 | Koch .................. F16K 11/0873 137/312 |
| 5,478,048 A | * | 12/1995 | Salesky .................. F16J 15/30 251/214 |
| 8,496,226 B2 | | 7/2013 | Dalluge et al. |
| 8,840,117 B2 | | 9/2014 | Guimet et al. |
| 9,157,531 B2 | | 10/2015 | Guimet et al. |
| 2003/0160504 A1 | * | 8/2003 | Chris ...................... B60T 7/042 303/114.1 |
| 2012/0211690 A1 | | 8/2012 | Anderson et al. |

OTHER PUBLICATIONS

French Search Report dated Jun. 23, 2015 in FR 1459891 filed Oct. 15, 2014.
"Complete valve solutions for the Delayed Coker industry," Velan, 2013, 12 pages.
U.S. Appl. No. 14/905,127, filed Jan. 14, 2016, US 2016/0144537 A1, Laurent Guimet et al.

* cited by examiner

ASSEMBLY FOR COMPRESSING A BALL VALVE SEAT

TECHNICAL FIELD

The present invention relates to the general field of ball-valves, and especially to the field of systems for compressing ball-valve seats.

The invention has applications in different industrial fields, particularly for use in ball-valves installed on pipework for hot, adhesive and/or potentially abrasive fluids. It applies, for example, to ball-valves used in the coking industry.

The invention thus provides an assembly for compressing a ball-valve seat.

THE STATE OF THE PRIOR ART

A ball-valve is a type of valve that is very widely used in industry. By design, the upstream-downstream seal-tightness of the ball-valve is provided by a circular seal which matches the shape of the ball. This circular seal may be made of an elastomeric material or other polymer, such as polytetrafluoroethylene (PTFE), but in all high temperature applications, that is those typically greater than 250° C., metal seals are frequently found and which are then usually called "seats". Since these seats generally do not have an elastic return as with elastomeric or polymeric materials, systems for applying pressure on the ball are often chosen to accompany them.

A great number of systems for compressing seats onto ball-valve balls therefore exist. Such a system typically comprises a spring element which pushes on the seat. This spring element is essential for use at high temperature. Indeed, at high temperatures the ball will expand and it then becomes important to maintain contact between the seat and the ball, regardless of dimensional variations. It is also important to provide a secondary seal between the seat and the valve body in order to block the leak pathway that is present.

Solutions have already been envisaged in the prior art. For example, U.S. Pat. No. 3,575,198 A describes the use of a Belleville washer as a spring element. A lip seal made of elastomeric or polymeric material provides the secondary seal. Such a system is only effective, however, over a limited temperature range (typically a maximum of 300° C.) due to the use of an elastomeric or polymeric material.

Furthermore, U.S. Pat. No. 3,891,183 A discloses a solution wherein an array of helical springs rests on the seat, the secondary seal being provided by a stack of square-section rings. These square rings can be made, for example, of graphite, in which case the temperature resistance of the assembly is greatly increased; that is to above 500° C. This solution, however, has large axial dimensions and cannot be used on a compact valve body. Moreover, in the event of graphite being used, the latter requires high compression in order to create a seal, in particular an axial compression of about 15 or 20 MPa at least is usually required. The overall compressive force generated by the springs will be transmitted to the ball at the contact surface and can potentially hinder the operation of the ball.

Furthermore, as an alternative to the use of graphite, U.S. Pat. No. 8,496,226 B2 describes an assembly wherein the seat is pushed by a metal bellows, this bellows providing the spring function and the sealing function with an added support to which it is welded. The seal between the valve body and the support is achieved by means of a metal gasket in the shape of a C ("C-ring"). This solution does not appear to be very suitable for use with adhesive fluids such as, for example, fluids present in coking units. In effect, if these fluids cool only slightly they may quickly solidify and therefore immobilise the bellows. The spring function is then lost. The same can also be said for the spring array disclosed by U.S. Pat. No. 3,891,183 A described above, which can likewise become clogged up.

Finally, the Canadian company Velan, based in Montreal, offers a solution to these problems with its range of valves dedicated to coking, as described in the English sales brochure entitled "Complete valve solutions for the Delayed Coker industry", published in 2013. The sealing system comprises a metal bellows, as in U.S. Pat. No. 8,496,226 B2. To prevent clogging, tappings are made in the valve body close to the bellows, for injecting steam from the outside. This prevents the bellows cooling and thus prevents them becoming clogged. This system appears to be effective but has a major drawback in that it involves high levels of steam consumption, with the latter being discharged into the main pipe.

DESCRIPTION OF THE INVENTION

There is therefore a need to provide an alternative solution to current systems for compressing ball-valve seats, and which is in particular suitable for ball-valves installed on pipes for hot, adhesive and/or potentially abrasive fluids.

The purpose of the invention is therefore to meet the above mentioned requirements and remedy the disadvantages, at least in part, relating to the embodiments of the prior art.

The invention thus provides, according to one of its aspects, an annular assembly for compressing a ball-valve seat, characterised in that it comprises:

A valve body or an insert attached to the valve body, provided with an internal annular counter-bore defining at least one inner counter-bore diameter of the valve body or of the insert, A sleeve inserted into said internal annular counter-bore, fixed and centred relative to the valve body or to the insert, the sleeve defining at least one outer diameter of the sleeve, the inner counter-bore diameter of the valve body or of the insert being greater than the outer diameter of the sleeve so that the valve body or the insert defines, with the sleeve, an annular housing wherein the assembly comprises, in succession, and in particular from downstream to upstream:

A downstream stack of head rings, in particular made of graphite, having an inner diameter equal to the outer diameter of the sleeve and an outer diameter equal to the inner diameter of the body or of the insert, this downstream stack being intended to be placed next to the ball-valve seat.

An annular head shim which is a sliding fit between the outer diameter of the sleeve and the inner diameter of the body or of the insert, A stack of means of compression, used to compress the ball-valve seat, An annular base shim, which is a sliding fit between the outer diameter of the sleeve and the inner diameter of the body or of the insert, and An upstream stack of base rings, in particular made of graphite, having an inner diameter equal to the outer diameter of the sleeve and an outer diameter equal to the inner diameter of the body or of the insert.

Thanks to the invention, it may be possible to obtain a compact assembly for compressing a ball-valve seat. Such an assembly may be operable at elevated temperatures, for example above 500° C., and may be difficult to block with the fluid being conveyed. The means of compression can be protected from becoming blocked by the seals provided by the upstream and downstream rings which are in particular made of flexible graphite. The assembly adapts to dimensional changes, for example to expansion/contraction, and allows a sufficient contact force to be continually maintained between the seat and the ball, irrespective of these changes. Furthermore, the assembly according to the invention can be effective without the introduction of steam for cleaning.

The compressing assembly according to the invention may also comprise one or more of the following characteristics, taken in isolation or in all possible technical combinations.

The annular housing formed by the assembly of the sleeve in relation to the valve body or to the insert is advantageously intended to be open towards the valve ball and closed facing away from the ball.

Advantageously, the stack of means of compression comprises one or more helical springs separated from one another by annular spacers.

The helical springs may in particular be springs with contiguous coils closed on themselves, preferably by welding, which in the at-rest state exhibit a torus shape.

The stack can be made with identical springs so as to achieve increases in compression and of elastic return at equal load that are proportional to the number of springs.

The use of torus-shaped helical springs can help ensure good elastic return. They offer a certain degree of compactness and provide the force required to ensure densification of the graphite.

This choice is in no way restrictive, however. Other means of compression may be envisaged in the context of the present invention. For example, the means of compression may comprise a mechanical bellows and/or a stack of Belleville-type spring washers. Mechanical bellows, however, have the disadvantage of requiring large axial dimensions and are relatively costly. As for the Belleville-type spring washers, given the space available for the assembly, by construction they cannot in general exert the force required for sufficient densification of the graphite.

During the installation of the assembly according to the invention, the stack of means of compression is compressed between the base of the counter-bore and the valve seat. In the case of torus-shaped springs, these are thus axially compressed, with each coil being radially compressed in cross-section. The selection of the correct compression distance can allow sufficient force to be obtained to ensure densification of the stacks of head and base rings which form the seals. By doing this the entry of fluid into this stack on either side of the stack of springs can be prevented. In effect, this compression causes the stack of head and base rings, in particular made of graphite, to expand radially, and sealing is ensured on contact with the sleeve and the body of the valve or of the insert. The stack of springs may also ensure compression of the seat onto the ball. It should also finally be noted that since the stacks of head and base rings are themselves compressed, their own elastic return comes into consideration in calculating the overall elastic return of the assembly. Thus, depending on the number of springs making up the stack of springs and the height of the annular head and base shims, it may be possible to adjust the elastic return of the entire assembly.

The axial faces of the annular spacers and/or the axial faces of the annular head and base shims, which are in contact with the helical springs, may comprise recesses in the form of arcs, in particular defined so that the centre of each of the arcs is located on a diameter which is identical to the mean diameter of the helical spring and so that the radius of each arc is equal to or greater than the radius of the coil of the helical spring.

The radius of each arc may be greater than a given value, defined as the radius mathematically equivalent to the curvature of the ellipse of the deformed spring in the vicinity of the contact point with an annular spacer and/or an annular head or base shim.

The downstream stack of head rings and/or the upstream stack of base rings may furthermore comprise graphite rings in the form of graphite elements of square or rectangular section.

Alternatively, the downstream stack of head rings and/or the upstream stack of base rings may comprise graphite rings in the form of tapered graphite elements.

In particular, the head rings and/or base rings may be tapered EVSP®-type graphite elements, in particular manufactured by the Garlock Sealing Technologies organisation.

The downstream stack of head rings and/or upstream stack of base rings can in particular each comprise at least one male tapered ring, a double-tapered ring and a tapered female ring.

According to a particular embodiment of the invention, the internal annular counter-bore may be stepped, defining a first inner counter-bore diameter and a second inner counter-bore diameter of the valve body or of the insert, the second inner counter-bore diameter being less than the first inner counter-bore diameter and greater than the first outer diameter of the sleeve. Similarly, the sleeve may be stepped, defining a first outer diameter and a second outer diameter of the sleeve, the second outer diameter being smaller than the first inner counter-bore diameter of the body or of the insert and greater than the first outer diameter of the sleeve.

Furthermore, the second inner counter-bore diameter may be formed at the annular base shim and at the upstream stack of base rings, being thus configured so as to guide the annular base shim and upstream stack of base rings only. Similarly, the second outer diameter may be formed at the downstream stack of head rings and at the annular head shim, being thus configured to guide the downstream stack of head rings and annular head shim only.

Furthermore, the annular base shim may be stepped, in particular in the same way as the internal annular counter-bore. Similarly, the annular head shim may be stepped, in particular in the same way as the sleeve.

The assembly for compressing the ball-valve seat according to the invention may comprise any of the features listed in the description, in isolation or in any technically possible combination with other features.

BRIEF DESCRIPTION OF THE DRAWINGS

The invention can be better understood from reading the detailed description that follows of examples of non-limiting embodiments thereof, and from examining the figures, schematic and partial, of the accompanying drawings, wherein.

In all of these figures identical references can designate identical or comparable elements.

In addition, in order to make the figures more readable, the various parts shown in the figures are not necessarily shown at a uniform scale.

DETAILED DESCRIPTION OF SPECIFIC EMBODIMENTS

Figure 1:
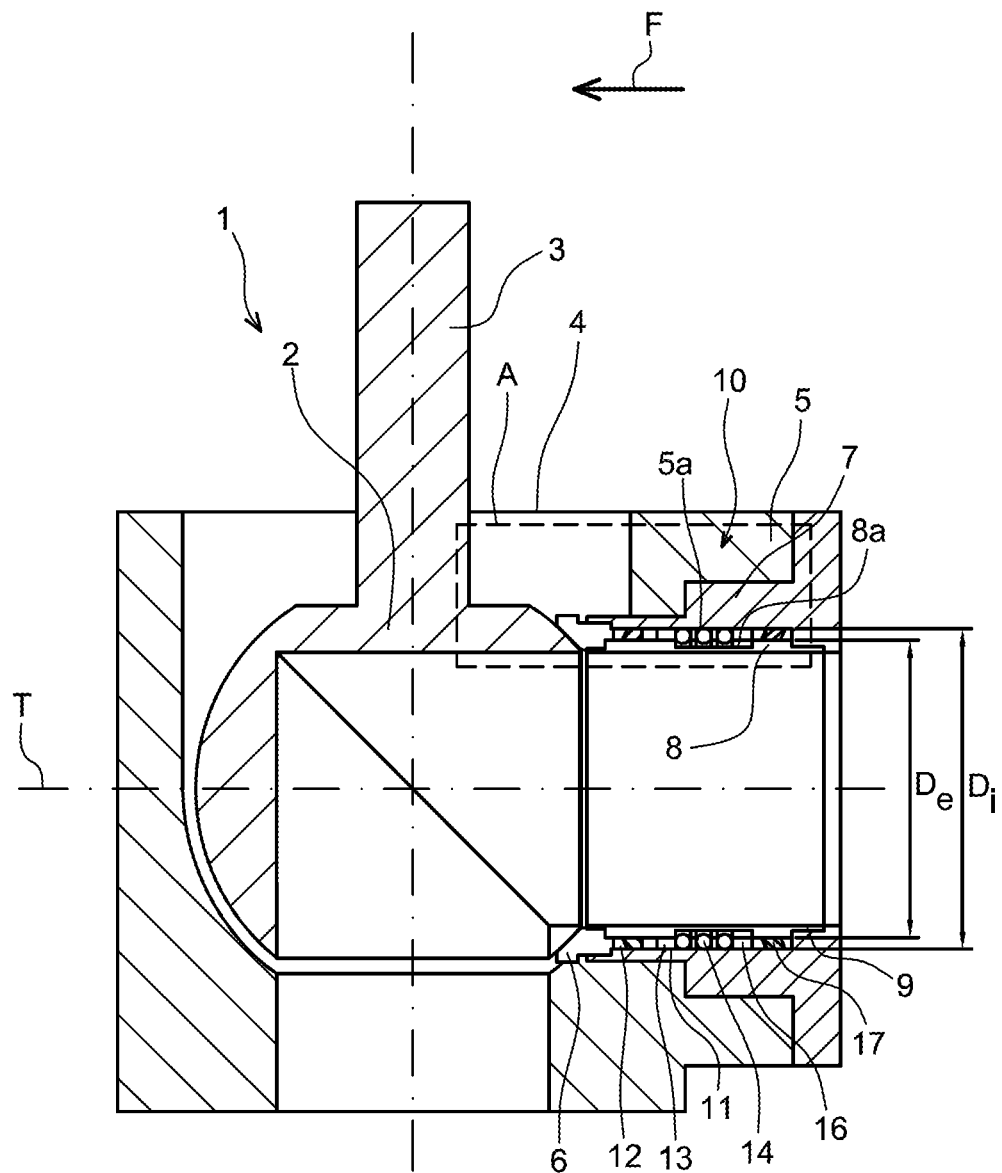
FIG. 1 shows, in section, an embodiment example of a ball-valve comprising an assembly for compressing the ball-valve seat according to the invention.
Figure 2:
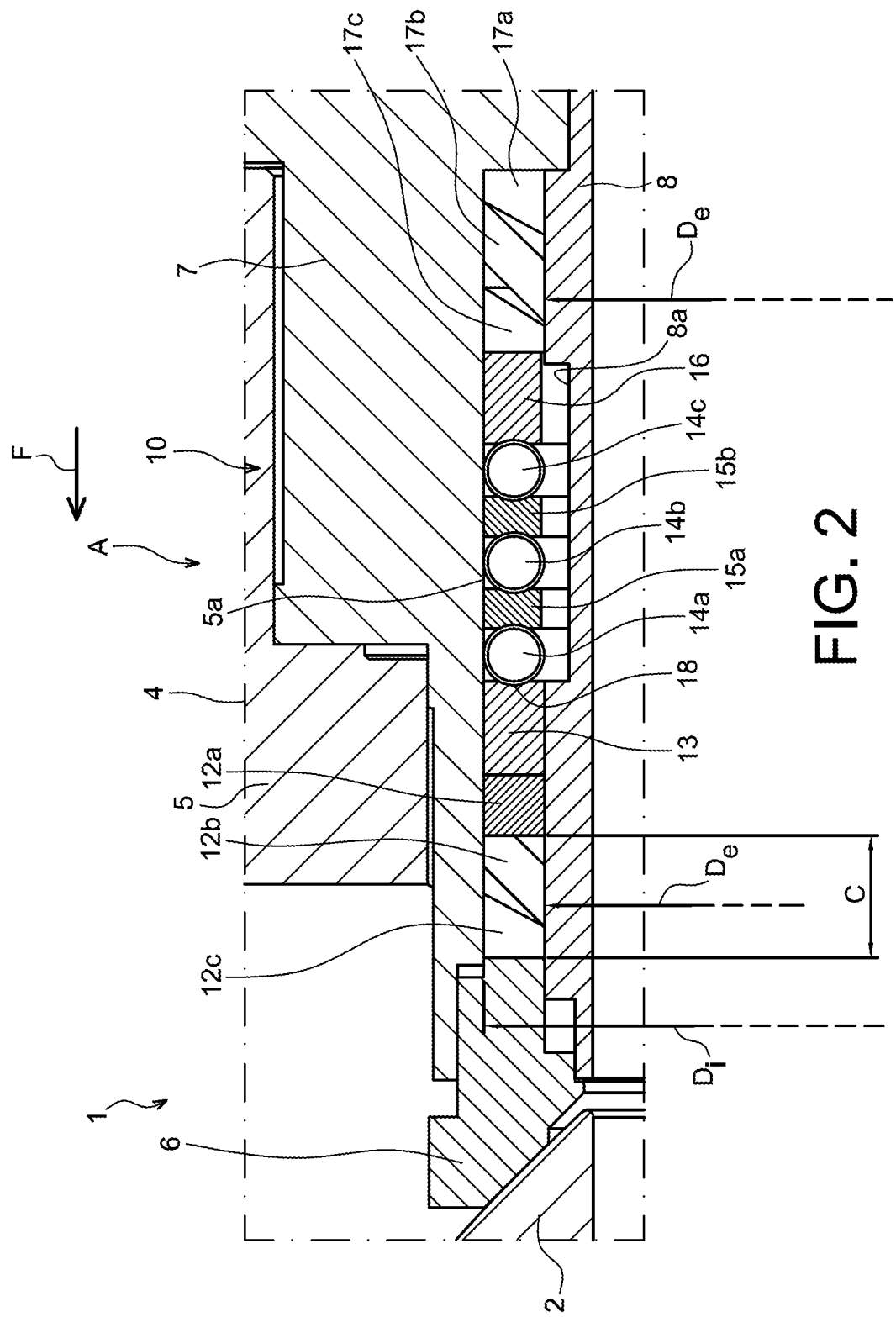
FIG. 2 shows, in section, the portion A of the ball-valve of FIG. 1.
Figure 3:
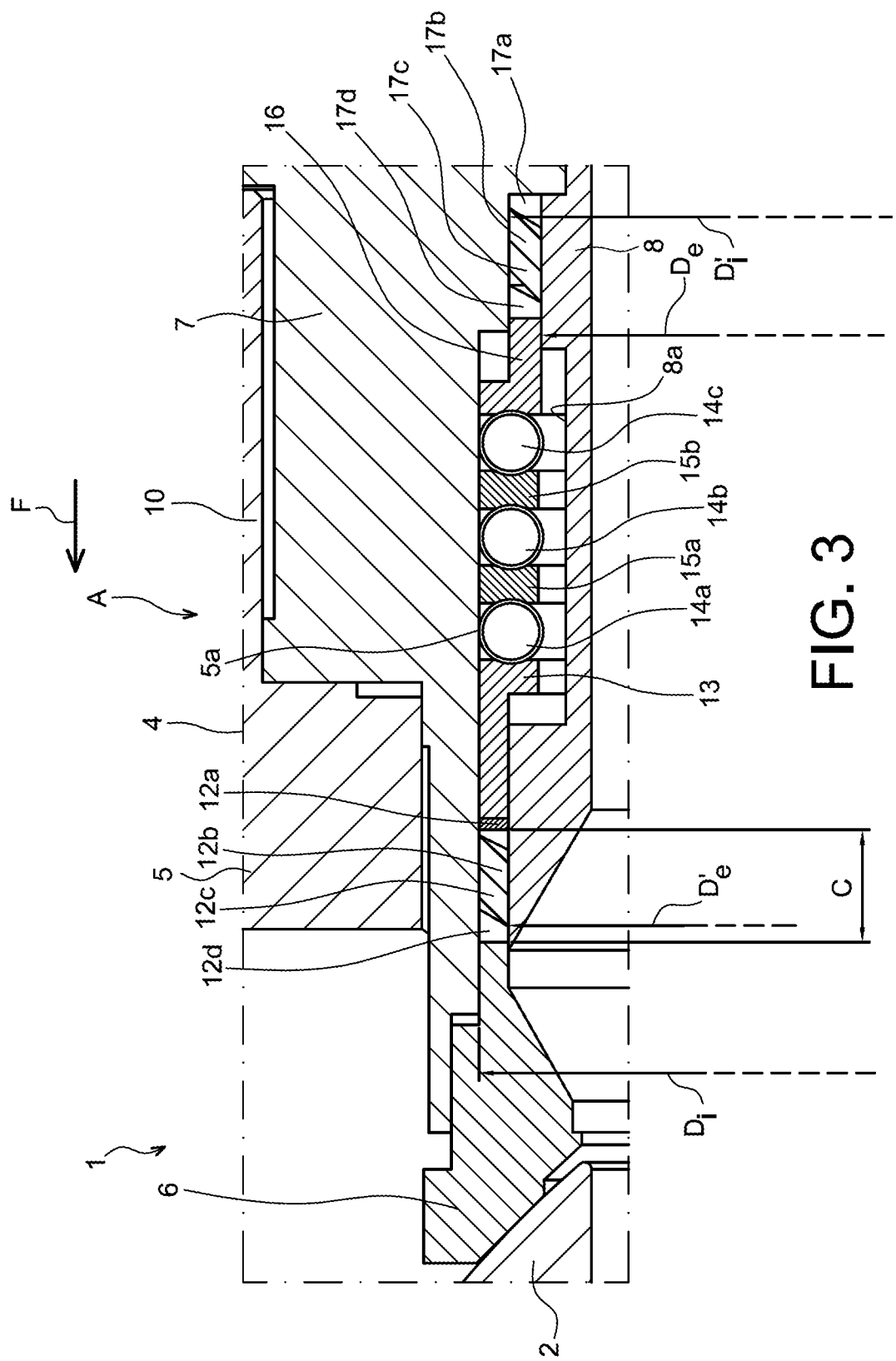
FIG. 3 is a view similar to that of FIG. 2, showing an alternative embodiment of a compression assembly according to the invention.

Throughout the description, it should be noted that the terms upstream and downstream are considered relative to a main normal fluid flow direction F (from upstream to downstream) for a ball-valve 1, that is from the compression assembly 10 of the valve 1 towards the ball 2 as shown in FIGS. 1 to 3. Furthermore, the longitudinal axis of the ball 2 and of the sleeve 8 are referred to as axis T of the valve 1, perpendicular to the longitudinal axis of the spindle 3 as shown in FIG. 1. An axial direction corresponds to the direction of the axis T of the valve 1. Furthermore, the adjectives and adverbs axial and axially are used in reference to the aforementioned axial direction.

With reference to FIGS. 1 and 2, a first embodiment of a ball-valve 1, in section, comprising an assembly 10 for compressing the ball-valve seat 6 according to the invention is first of all presented hereafter.

The ball-valve 1 thus comprises a ball 2 linked to a spindle 3, and a valve seat 6. The assembly is located in a valve body 5.

The valve 1 is closed off by a cover (not shown), which sits on a support surface 4. Moreover, the seat 6 presses on the ball 2, providing the usual seal for such a valve 1.

An insert 7 is fixed into a counter-bore of the body 5. Furthermore, the assembly 10 comprises a sleeve 8 which is fixed and centred in the insert 7 at the contact area 9. The fixing may be achieved, for example, by welding in this area 9.

The insert 7 comprises, in the example in FIGS. 1 and 2, an inner counter-bore of diameter Di. In addition, the sleeve 8 has an external outer De. A clearance 8a is formed on the outer surface of diameter De of the sleeve 8, at the springs 14a-14c.

The inner diameter Di of the insert 7 is larger than the outer diameter of the sleeve 8 so that the insert 7 defines, with the sleeve 8, an annular housing 11 in which the assembly 10 comprises, in succession, from downstream to upstream, that is, from the ball 2 towards the assembly 10, a plurality of elements providing compression, namely: a downstream stack 12 of graphite head rings placed next to the seat 6 of ball-valve 1, an annular head shim 13, a stack of helical springs 14 for compressing the seat 6 of the ball-valve 1, an annular base shim 16 and an upstream stack 17 of base rings made of graphite.

FIG. 2 shows a detail view according to A of the assembly 10 of FIG. 1.

In this example, the means of compression 14 comprise three torus-shaped springs 14a, 14b and 14c (from downstream to upstream). These springs 14a, 14b and 14c are separated by spacers 15a and 15b, centred on the inner diameter Di of the insert 7. The number of springs, and therefore of spacers, may vary according to the overall stiffness desired for the assembly.

The stack of springs 14 is separated by means of the base shim 16, which is also centred on the inner diameter Di of the insert 7, from the upstream stack 17 of graphite base rings composed of (from upstream to downstream) a male tapered ring 17a, a double-tapered ring 17b and a female tapered ring 17c.

Moreover, the stack of springs 14 is also separated by means of the head shim 13, which is also centred on the inner diameter Di of the insert 7, from the downstream stack 12 of graphite head rings composed of (from upstream to downstream) a male tapered ring 12a, a double-tapered ring 12b and a female tapered ring 12c.

The choice of graphite head rings 12a-12c and base rings 17a-17c is important, as it determines the leak tightness and therefore the reliability of the assembly 10 whilst eliminating the risk of blockages close to the stack of springs 14. A first solution is to use stamped graphite rings with square or rectangular sections.

This type of assembly can, however, undergo high levels of differential radial expansion, leading to an increase in the width of the housing 11 (that is (Di−De)/2) allocated to the assembly 10. The stamped square or rectangular rings are often poor at withstanding this type of stress. They may therefore be replaced by more accommodating double-tapered graphite ring systems. A commercial product comprising this type of ring, known as "EVSP" and marketed by the US company Garlock Sealing Technologies can be fitted instead of rectangular or square graphite rings.

The assembly 10 is shown "at rest", that is without compression, in FIGS. 1 and 2. A crossover C of geometry can therefore be seen between the seat 6 and the head sealing shim 13. The length of this crossover C corresponds to the compression distance of the complete assembly 10.

The clearance 8a in the sleeve 8 means that if necessary springs 14a, 14b, 14c can be used whose cross-section diameter is greater than the value (Di−De)/2. This may be an advantage in optimising the geometric configuration of the springs in certain cases.

Moreover, the springs 14a-14c must be centred relative to the seat 6, in order to ensure adequate compression of the latter. When compressed each circular coil takes up an elliptical shape in cross section, whose main axis is perpendicular to the axis of the torus. By centering each spring 14a-14c on its internal or external diameter, when compressed it will collide with the chosen centering diameter. At this instant the stiffness of the spring may increase significantly. It is important that a large amount of play is left in the inner and outer diameters of each spring 14a-14c.

Recourse may be made to another means in order to centre them: at the aforementioned shims 13, 16 and annular spacers 15a, 15b, the recesses 18 may be axially hollowed out on all the faces in contact with the springs 14a, 14b, 14c, rather than opting for opting for the rectilinear support faces. These have the form of an arc in cross-section.

Thus, for example, on the head shim 13 a recess 18 is located, in the form of an arc whose radius is equal to or greater than the cross-section of the spring 14a, ensuring alignment of the spring 14a with the shim 13. This construction is duplicated over all of the interfaces involving springs 14b and 14c with spacers 15a, 15b or the neighbouring shim 16. In other words, the spacers 15a, 15b and the shim 16 also comprise a recess used to position them in relation to the springs 14a, 14b, 14c.

Thus the centre of each of the recesses in the form of arcs is located on a diameter which is the same as the mean diameter of the torus-shaped spring. The radius of each arc is equal to or greater than the radius of the coil of each spring 14a, 14b, 14c. The presence of these recessed allows self-alignment of the stack of springs 14a-14c with the shims 13, 16 and annular spacers 15a, 15b. Naturally, the shims 13, 16 and annular spacers 15a, 15b are themselves centred in the assembly 10 via their inner or outer diameters. The torus-shaped springs 14a-14c are therefore centred in the assembly 10 in a manner other than by their internal or external diameters.

In the contact zone between the springs 14a-14c and the shims 13, 16 or the spacers 15a, 15b, the elliptical shape of the compressed spring may be mathematically associated with a radius of value Req. Ideally, the recesses will have a radius greater than Req in order to release as much of the spring kinetics as possible.

Earlier, in the part relating to the prior state of the technique, a difficulty was identified in U.S. Pat. No. 3,891,183 as regards the potential contradiction between the overall force EG required to ensure densification of the graphite in the rings (which may be high) and the support force of the seat 6 on the ball 1, which it is sought to reduce in order to facilitate rotation of the ball 1 when operating the valve 1. In effect, compressing the graphite in the rings to a given seating pressure PA will develop an overall force EG equal to $Pi \times (Di^2 - De^2)/4 \times PA$, which will be transmitted to the ball 2 by contact with the seat 6. In order to simplify the architecture of the system as much as possible, one can attempt to maximise the spring 14a, 14, 14c torus diameter. By doing this the springs 14a, 14b, 14c have a greater compressibility and a greater elastic return. Thus the stacking of a large number of small springs in order to obtain the same elastic return can be avoided. Moreover since the seating pressure PA is the parameter with the greatest influence in terms of the seal quality achieved by the graphite sealing element of the head shims 13 and base shims 16, increasing this seat pressure may assist sealing and reduce the risk of blockage of the springs 14a, 14b and 14c. Increasing the torus diameter, however, means that the difference Di-De increases, and since the seating pressure PA also increases, then the overall force EG applied to the graphite similarly increases, thus increasing the operating torque of the ball-valve 1 so as to hinder operation of the ball 2 (since this overall force EG is re-transmitted in its entirety in contact between the seat 6 and the ball 2). In order to limit the overall force EG, an attempt may be made to reduce the section of the assembly, that is, (Di−De)/2. This, however, implies a corresponding reduction in the cross-section of the springs 14, 14b and 14c. For optimisation of the geometric configuration of the assembly 10, it is generally desirable to retain springs with large cross-sections, combining the ability to deform with a good elastic return. Thus FIG. 3 shows how to overcome this difficulty. It shows an alternative embodiment of the assembly 10 according to the invention, according to a view similar to that of FIG. 2.

As can be seen, the stack of means of compression 14 made up of springs 14a-14c and spacers 15a, 15 remains unchanged.

Two steps can be seen, however: one on the sleeve 8, with the presence of a second outer diameter De', in addition to the first outer diameter De, and one on the counter-bore of the insert 7, with the presence of a second inner diameter Di', in addition to the first inner diameter Di.

Thus the insert 7, or alternatively the body 5, may be stepped only at its portion in contact with the stack 17 of graphite base rings. Similarly the sleeve 8 may be stepped only at its portion in contact with the stack 12 of head rings.

In this particular case the following relationship is obtained: Di'=De'=(Di+De)/2. The references 17a, 17b, 17c and 17d and references 12a, 12b, 12c and 12d respectively represent the base and head ring seals, which are in particular tapered graphite elements of the EVSP type, maintained respectively between De' and Di, and between De and Di'.

Both these upstream 12 and downstream 17 sealing stacks have approximately the same cross-section, equal to half the cross-section of the sealing stack of the assembly 10 in FIG. 2. For the same overall force EG applied to the gate, the stress applied to the seals will therefore be doubled. In the light of the configuration in FIG. 3, it can be understood that stepping is rendered necessary because of assembly difficulties. Without steps, it would be impossible to insert the spacer washers 15a and 15b between the springs 14a-14c. This stepping moreover requires that the cylindrical shims 13 and 16 of the configuration in FIG. 2 be modified by using stepped shims 13 and 16 with an "L"-shaped section for the configuration in FIG. 3.

For equal spring stacks, the cross-section of the graphite rings 17a-17d and 12a-12d is thus significantly reduced.

In general one seeks to achieve substantially the same cross-section for the base ring 17a-17d and head ring 12-12d seals, in order to apply similar stresses to them during compression. Thus using a reasonable mathematical approximation, Di-De'=Di'-De.

The invention is, of course, not restricted to the embodiment examples that have just been described. Various modifications may be made to it by those skilled in the art.

The expression "comprising a" must be understood as being synonymous with "comprising at least one", unless specified to the contrary.

The invention claimed is:

1. An annular assembly for compressing a seat of a ball-valve, comprising:
   an insert attached to a valve body, including an internal annular counter-bore defining at least one inner counter-bore diameter of the insert;
   a sleeve inserted into the internal annular counter-bore, fixed and centered relative to the insert, the sleeve defining at least one outer diameter of the sleeve, the sleeve being stepped and defining a first outer diameter and a second outer diameter of the sleeve;
   the inner counter-bore diameter of the insert being greater than the first outer diameter of the sleeve, the insert defining, with the sleeve, an annular housing, the internal annular counter-bore being stepped and defining a first inner counter-bore diameter and a second inner counter-bore diameter of the insert; and
   in succession, from downstream to upstream:
      a downstream stack of head rings, an inner diameter of the downstream stack of head rings being equal to the second outer diameter of the sleeve and an outer diameter of the downstream stack of head rings being equal to the first inner counter-bore diameter of the insert, the downstream stack of head rings being placed next to the seat of the ball-valve,
      an annular head shim being a sliding fit between the second outer diameter of the sleeve and the first inner counter-bore diameter of the insert,
      a spring configured to compress the seat of the ball-valve,
      an annular base shim being a sliding fit between the first outer diameter of the sleeve and the second inner counter-bore diameter of the insert, and
      an upstream stack of base rings, an inner diameter of the upstream stack of base rings being equal to the first outer diameter of the sleeve and an outer diameter of the upstream stack of base rings being equal to the second inner counter-bore diameter of the insert, wherein the second inner counter-bore diameter is smaller than the first inner counter-bore diameter and greater than the first outer diameter of the sleeve, and formed at the annular base shim and the upstream stack of base rings, the second inner counter-bore diameter being configured to guide the annular base shim and the upstream stacks of base rings only, and wherein the second outer diameter is smaller than the first inner counter-bore diameter of the insert and greater than the first outer diameter of the sleeve, and formed at the downstream stack of head rings and the annular head shim, the second outer diameter being configured to guide the downstream stack of head rings and the annular head shim only.

2. The assembly according to claim 1, wherein the spring includes one or more helical springs separated from each other by annular spacers.

3. The assembly according to claim 2, wherein axial faces of the annular spacers and/or axial faces of the annular head shim and base shim, which are in contact with the helical springs, include recesses in a form of arcs, defined so that the center of each of the arcs is located on a diameter identical to a mean diameter of the helical spring and such that the radius of each arc is equal to or greater than a coil radius of the helical spring.

4. The assembly according to claim 3, wherein the radius of each arc is greater than a radius mathematically equivalent to a curvature of an ellipse of a deformed spring in a contact zone with the annular spacers and/or the annular head or base shim.

5. The assembly according to claim 1, wherein the downstream stack of head rings and/or the upstream stack of base rings include graphite rings in a form of graphite elements of square or rectangular section.

6. The assembly according to claim 1, wherein the downstream stack of head rings and/or the upstream stack of base rings include graphite rings in a form of tapered graphite elements.

7. An annular assembly for compressing a seat of a ball-valve, comprising:

an insert attached to a valve body, including an internal annular counter-bore defining at least one inner counter-bore diameter of the insert;

a sleeve inserted into the internal annular counter-bore, fixed and centered relative to the insert, the sleeve defining at least one outer diameter of the sleeve, the sleeve being stepped and defining a first outer diameter and a second outer diameter of the sleeve;

the inner counter-bore diameter of the insert being greater than the first outer diameter of the sleeve, the insert defining, with the sleeve, an annular housing, the internal annular counter-bore being stepped and defining a first inner counter-bore diameter and a second inner counter-bore diameter of the insert; and in a succession, from downstream to upstream:

a downstream stack of head rings, an inner diameter of the downstream stack of head rings being equal to the second outer diameter of the sleeve and an outer diameter of the downstream stack of head rings being equal to the first inner counter-bore diameter of the insert, the downstream stack of head rings being placed next to the seat of the ball-valve, an annular head shim being a sliding fit between the second outer diameter of the sleeve and the first inner counter-bore diameter of the insert, a spring configured to compress the seat of the ball-valve, an annular base shim being a sliding fit between the first outer diameter of the sleeve and the second inner counter-bore diameter of the insert, and an upstream stack of base rings, an inner diameter of the upstream stack of base rings being equal to the first outer diameter of the sleeve and an outer diameter of the upstream stack of base rings being equal to the second inner counter-bore diameter of the insert, wherein the second inner counter-bore diameter is smaller than the first inner counter-bore diameter and greater than the first outer diameter of the sleeve, and wherein the second outer diameter is smaller than the first inner counter-bore diameter of the insert and greater than the first outer diameter of the sleeve.

* * * * *